May 24, 1927.
J. C. STEARNS
1,629,549
TAIL AND SIGNAL LAMP
Filed May 14, 1924
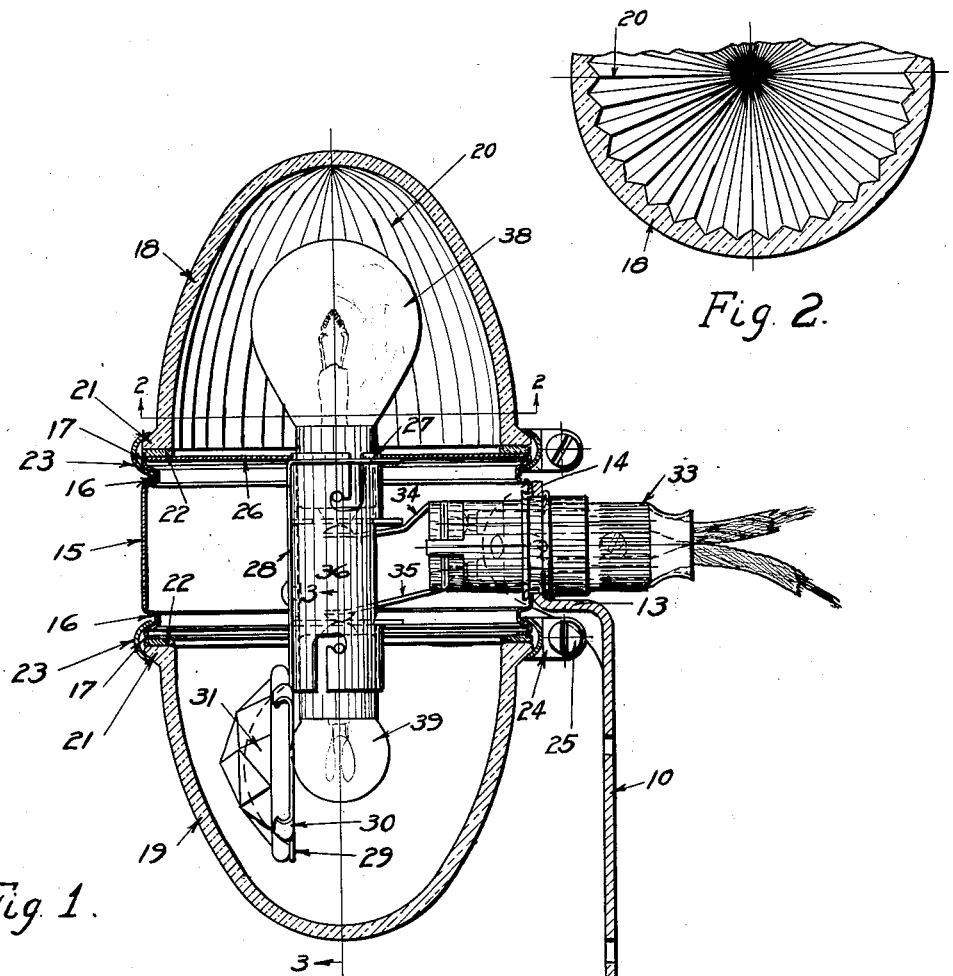
Fig. 2.
Fig. 1.
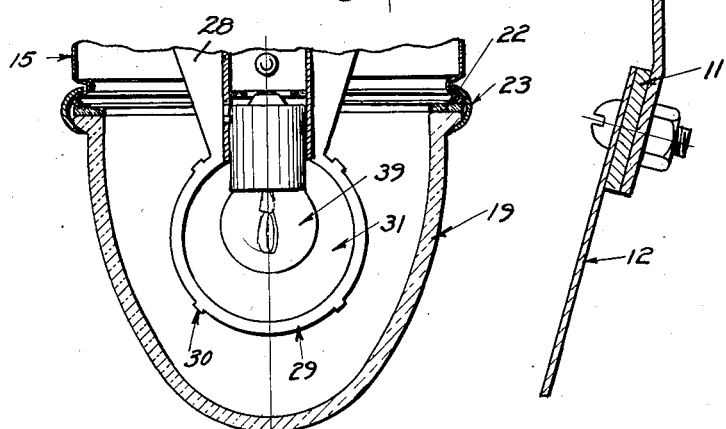
Fig. 3.
INVENTOR
JASON C. STEARNS.
BY ATTORNEYS
Southgate & Southgate Patented May 24, 1927.

1,629,549

UNITED STATES PATENT OFFICE.

JASON C. STEARNS, OF WORCESTER, MASSACHUSETTS.

TAIL AND SIGNAL LAMP.

Application filed May 14, 1924. Serial No. 713,351.

The principal objects of this invention are to provide a very simple arrangement by which the usual red light will be exhibited at the rear of a motor vehicle and the same illuminating device will be caused to light up brightly the number plate; to combine with this a neat and inexpensive construction by which a signal indicating stopping, or slowing up, or turning can be given, the parts being arranged in a compact and symmetrical manner; and to provide for shielding the red tail light and lens from breakage and from dust and dirt.

The invention also involves improvements in the details of construction, as will appear.

Reference is to be had to the accompanying drawings in which—

Fig. 1 is a side view of a lamp constructed in accordance with this invention shown with everything except the lamps and conducting elements in central vertical section;

Fig. 2 is a horizontal section of the signal lamp on the line 2—2 of Fig. 1; and Fig. 3 is a central vertical section of the tail lamp on the line 3—3 of Fig. 1.

In the first place I provide a bracket 10 perforated so that it can be bolted to any convenient part of the frame of an automobile or to a spare tire carrier. This has a bar 11 at the bottom permanently fixed to it and provided with slots so that the number plate 12 can be detachably secured to the bar. Thus, the number plate is fixedly held in position.

At the top the bracket 10 has a rearward projection 13 extending upwardly to provide a plate 14 in a vertical position but curved around so that it can be riveted or otherwise secured to a cylindrical sheet metal lamp casing 15. On account of the construction that will be described below, this lamp casing can be very small indeed and especially of a height of not over an inch in ordinary cases. It is provided with two circumferential grooves 16 at the top and bottom extending all the way around with circular flanges 17 beyond them formed integrally with the casing 15. The casing has a flat top 26 and is open at the bottom. This is all the metal casing there is for the device.

The two circumferential grooves 16 are used for the purpose of mounting on the top and bottom of this vertical cylindrical casing a pair of glass covers 18 and 19. These are usually called domes or globes and are shown as hemi-ellipsoids which makes the whole lamp look substantially like a true ellipsoid although it has a cylindrical part at the center. This is a neat construction that can be cleaned very easily. Each one has a circumferential bead 21 around its open end. These covers are placed up against the top and bottom of the casing 15 so that the beads are separated from the flanges 17 slightly by a packing 22 of an annular shape of any convenient yielding material, but preferably of soft rubber, placed next to them and between the bead and the flange in each case. A pair of concave-convex annular rings 23 of sheet metal are clamped around the respective beads and flanges to hold the two covers in position. These rings are split in one place and have radial flanges 24 which are held together by bolts or screws 25 to hold the covers detachably in position.

The translucent globe or cover 18 is colored green, or any color indicating danger, and provided with longitudinal frosted triangular corrugations 20 inside and is smooth outside for the purpose of more uniformly distributing the light rays therein and causing the entire area of the cover to give off illumination from every point thereof. The corrugations have the effect of causing the rays from the single light inside to appear to come from diverging points and thereby thoroughly illuminate all parts of the area. The cover itself also protects the lamp 38 inside and that is supported by a solid wall 26 as stated, so that it will not tend to vibrate unduly.

The last remark also applies to the lamp 39 supported in the same way. The detachable transparent cover 19 surrounds the jewel 31 and the electric lamp 29 and protects them and keeps dust and mud from the surface of the jewel so that it will remain bright at all times. It is very easy to wipe off the smooth outer surface of the two covers.

When the device is made up in this way the general shape of the whole lamp is ellipsoidal with the ends separated and a cylindrical portion between them. This constitutes a neat and harmonious structure and takes up very little room. It is easy to assemble and easy to take apart and put together in case of breakage or other damage.

The top of the casing 15 is formed preferably by a solid plate 26 of sheet metal and flat on top but this is perforated at the center. Under the top wall surrounding the perforation is secured a sheet metal plate 27 which is perforated at the center and which extends down at one side of the center to form a vertical bracket 28. This bracket is provided with a circular portion 29 at the bottom having integral lugs 30 for holding a circular glass lens or "jewel" 31 preferably colored red. Preferably this is formed slightly convex on the rear and with facets on its convex side. The other side is either flat or concave.

Through the plate 14 there is a perforation and in this is located an electrical connector 33 arranged to carry two wires through it, insulated from each other. These are connected individually through two conducting terminals 34 and 35 arranged in the form of spring arms and extending into a hollow cylindrical connector 36 which is secured to the bracket 28 and is arranged in vertical position. This connector extends up through the perforation in the center of the top wall 26 so as to receive a lamp 38 in the cover 18. The bottom of the connector 36 extends down into a position to receive another lamp 39 in horizontal axial alignment with the jewel 31 so that it is located directly in front of it.

The wires connected with the spring terminals 34 and 35 are connected up in the usual way so that one of them can be turned on by a switch at the dash to light up the tail lamp 39 at the bottom to furnish the desired red light. The other one is connected up with a switch to be operated either by hand, or preferably automatically in the usual way, to light the lamp 38 and show a danger signal when the vehicle is slowing up for the purpose of stopping or turning. These lamps are grounded on the other side as usual.

This furnishes a very simple, neat and convenient combined danger and tail lamp having few parts likely to get out of order and easily taken apart and put together again when the lamps burn out or in case of any other trouble. It is rigidly mounted and has a symmetrical appearance.

Although I have illustrated and described only a single form of the invention, I am aware of the fact that modifications can be made therein by any person skilled in the art without departing from the scope of the invention as expressed in the claims. Therefore I do not wish to be limited to all the details of construction or to the specific shapes herein shown and described but what I do claim is:—

1. In a tail and signal lamp, the combination with a cylindrical metallic casing having a pair of outwardly extending flanges at its top and bottom and provided with a partition across it, of a pair of hollow covers of glass, each having an open end provided with a bead therearound set against one of said flanges on opposite sides of the casing, a single ring of arcuate transverse section around each adjacent flange and bead for holding the covers against the bottom and top of the casing, electrical connections extending through the cylindrical wall of said casing horizontally, a lamp in each of said covers, means carried by the casing and extending vertically through the center of the casing for supporting said lamps on opposite sides of the partition, and means extending from said electrical connection for connecting the lamps with a source of power.

2. In a tail and signal lamp, the combination with a cylindrical metallic casing, of a pair of covers of glass, each having an open end set against the opposite ends of the casing, and coinciding with them, means for holding the covers against the bottom and top of the casing so that they close them, the casing having an integral top extending across the bottom of one of said covers having a perforation at the center, a lamp connector located vertically in said perforation and depending down from it and having a lamp in its upper end located in the upper cover and a lamp in its bottom end located in the lower cover, a bracket supported by the integral top wall of said casing and hanging down into the lower cover, and a colored glass supported by said bracket in horizontal alignment with the lower lamp and behind it.

3. In a tail and signal lamp, the combination with a bracket, of a metallic casing carried by the bracket, means in the casing for holding a lamp depending below the bottom of said casing, a transparent cover below the casing supported thereby all around the upper edge of the cover spaced from the bracket and surrounding the lamp, and means between the lamp and the cover for coloring the rays projected rearwardly from the lamp.

4. In a tail and signal lamp, the combination with a metallic casing, of a pair of transparent covers, each having an open end set against opposite ends of the said casing, means for holding the covers against the bottom and the top of said casing, the casing having a partition and a hanger or support, a lamp connector or socket, means for holding it vertically in said casing, and having a lamp in its upper end located in the upper cover and a lamp in its bottom end located in the lower cover, a bracket supported by said hanger and hanging down into the lower cover, and a colored glass supported by said bracket in horizontal alignment with the lower lamp and behind it.

In testimony whereof I have hereunto affixed my signature.

JASON C. STEARNS.